US008545682B2

(12) United States Patent
Jones et al.

(10) Patent No.: US 8,545,682 B2
(45) Date of Patent: Oct. 1, 2013

(54) SWIMMING POOL CLEANING AND SANITIZING SYSTEM

(75) Inventors: Phillip Henry Jones, Tallai (AU); Gary Arthur Stutt, Robina (AU)

(73) Assignee: Enviro Swim Pty Ltd, Southport (AU)

( * ) Notice: Subject to any disclaimer, the term of this patent is extended or adjusted under 35 U.S.C. 154(b) by 774 days.

(21) Appl. No.: 12/189,137

(22) Filed: Aug. 9, 2008

(65) Prior Publication Data

US 2008/0314762 A1  Dec. 25, 2008

Related U.S. Application Data

(63) Continuation-in-part of application No. 11/271,067, filed on Nov. 10, 2005, now abandoned, which is a continuation of application No. PCT/AU2004/000681, filed on May 21, 2004.

(30) Foreign Application Priority Data

May 23, 2003 (AU) ............................... 2003902540

(51) Int. Cl.
*C25B 9/00* (2006.01)
*B01J 19/10* (2006.01)
*C02F 1/34* (2006.01)
*C02F 1/461* (2006.01)

(52) U.S. Cl.
USPC ...... 204/267; 204/157.42; 204/269; 205/742; 205/760; 210/748.03; 210/748.18; 422/20

(58) Field of Classification Search
USPC ......... 204/157.42, 275.1, 267, 269; 205/742, 205/760; 210/748.02, 748.03, 748.04, 748.05, 210/748.06, 748.07, 748.09, 748.16, 748.17, 210/748.18, 748.19; 422/20
See application file for complete search history.

(56) References Cited

U.S. PATENT DOCUMENTS

| 5,074,998 A | * | 12/1991 | De Baat Doelman | 210/222 |
| 5,085,753 A | | 2/1992 | Sherman | 204/267 |
| 5,711,865 A | * | 1/1998 | Caesar | 205/628 |
| 5,753,100 A | * | 5/1998 | Lumsden | 205/742 |
| 6,145,542 A | * | 11/2000 | Walker | 137/827 |
| 6,238,546 B1 | | 5/2001 | Knieper et al. | 205/742 |
| 6,455,316 B1 | | 9/2002 | Turner et al. | 436/37 |
| 6,875,360 B2 | * | 4/2005 | Allen et al. | 204/660 |

FOREIGN PATENT DOCUMENTS

| RU | 2043974 C1 | 9/1995 |
| WO | WO 97/11908 | 3/1997 |
| WO | WO 02/062709 A1 | 8/2002 |
| WO | WO 2004/103912 A1 | 2/2004 |

OTHER PUBLICATIONS

Paul Wright, Ph.D., Annex: "*Pseudomonas aeruginosa* Disinfection in Pool Spas; Laboratory experiments conducted with Envrioswim System for WaterTech Services International Pty Ltd.", May 6, 2004.

* cited by examiner

*Primary Examiner* — Keith Hendricks
*Assistant Examiner* — Steven A. Friday
(74) *Attorney, Agent, or Firm* — George W. Moxon, II; Brian P. Harrod (57) ABSTRACT

An in-line cleaning and sanitation apparatus for cleaning a liquid, the apparatus including electronic oxidation means to increase the oxidation reduction potential of the liquid, and ionization means to produce ions having an algaecidal or bactericidal effect into the liquid, in that order together with ultrasonic cleaning means to introduce sound waves into the liquid, and wherein the ionization means, the ultrasonic cleaning means and the electronic oxidation means are operated simultaneously for a period to clean and sanitize the liquid in the absence of added salt, chlorine or other chemicals.

15 Claims, 1 Drawing Sheet

(Prior Art)

SWIMMING POOL CLEANING AND SANITIZING SYSTEM

PRIORITY TO RELATED PATENT APPLICATION

This patent application is a Continuation-In-Part of U.S. patent application Ser. No. 11/271,067, which was filed on Nov. 10, 2005 now abandoned and is incorporated herein by reference in its entirety. U.S. patent application Ser. No. 11/271,067 in turn claims priority to International Patent Application No. PCT/AU2004/000681, entitled "A Swimming Pool Cleaning and Sanitising System," which was filed under the Patent Cooperation Treaty (PCT) on May 21, 2004, and claims priority to Australian Patent Application No. 2003902540 filed in Australia on May 23, 2003, said applications expressly incorporated herein by reference in their entireties.

TECHNICAL FIELD

The present invention relates to swimming pools, spas & water features and in particular to a method and apparatus for improving the cleaning and sanitizing of the water contained in swimming pools, spas & water features.

BACKGROUND OF THE INVENTION

The cleaning and sterilization of swimming pools is currently accomplished using any one or more of mechanisms such as salt water chlorination or chlorine addition.

Chlorine is a strong bleach. It is dangerous. Side effects of its use can include red, irritated eyes, dried and brittle hair, and swimmers ear, bleached out swimsuits, dry itchy skin, and a clinging odor of chlorine.

Chlorine absorbs through the skin. Studies have linked chlorine with cancer, high blood pressure, anemia, heart disease, hardening of the arteries, senility, stroke and other degenerative diseases. Scientists have reported that chlorine is a leading cause for the erosion of the earth's ozone layer. It only occurs naturally safely wrapped up in compounds which are relatively unreactive.

Some of the problems associated with using chlorine have been discussed in literature sources such as:
1. Aggazzotti, G., Fantuzzi, G., Righi, E., & Predieri, G. (1998). Blood and breath analyses as biological indicators of exposure to trihalomethanes in indoor swimming pools. *Science of the Total Environment*, 217, 155-163.
2. Lindstrom, A. B., Pleil, J. D., & Berkoff, D. C. (1997). Alveolar breath sampling and analysis to assess trihalomethane exposures during competitive swimming training. *Environmental Health Perspectives*, 105(6), 636-642. And
3. Drobnic, F., Freixa, A., Casan, P., Sanchis, J., & Guardino, X. (1996). Assessment of chlorine exposure in swimmers during training. *Medicine and Science in Sports and Exercise*, 28(2), 271-274.

Salt water chlorination is a particularly popular technique in which salt (pure, natural rock salt) is dissolved in pool water and then subjected to simple electrolysis. This electrolysis usually takes place in an in-line electrolysis cell. The chloride portion of the salt (sodium chloride) is transformed during the electrolysis into an effective sanitizer, hypochlorous acid, (HOCl) which has the ability to oxidize (kill) bacteria, virus, algae and other such radicals which would otherwise flourish in the water. This process is reversible, so does not consume the salt, which is simply used over and over again.

HOCl is the same effective sanitizer as would result if 'pool chlorine' was added to the water—is utilised to minimise the potentially dangerous chlorine compounds and the obnoxious 'chemical' effects commonly associated with manual chlorination—and without the need to handle chemicals. It does not always achieve this aim.

Oxidation normally takes place in a swimming pool where the water and its associated contaminants are affected by a chemical oxidizer added to the water and used to oxidize oils and body fats. The chemical oxidizers increase the Oxidation Reduction Potential (ORP) of the water in the pool, but they also have their disadvantages. Oxidation Reduction Potential (ORP) is the extent to which a chemical ion exchanges electrons, which lead to electrical charges, during a chemical reaction.

Chemical oxidizers are quite expensive as they must be continually purchased and added to the water. They are also known to have serious health issues regarding toxicity of chemicals & proven toxic side effects of the by-products which include Chloramines, Triharlomethanes and Ozone.

Ionisation is an alternative method used in the sanitizing of swimming pools. Ionization produces copper ions (algaecide) and silver ions (bactericide) into the water flow of the swimming pools. Ionisation is not as effective as a stand-alone treatment for a swimming pool as it requires the addition of an oxidizer in order to be effective. One major benefit of ionization is its residual qualities. The copper and silver ions are not affected by heat or ultraviolet light and will remain in the water effective as a sanitizer for weeks after the system is shut down. Unlike chlorine and ozone, the copper/silver ions are not considered toxic at the levels required to sanitize the water.

The modern ioniser consists of two parts; the electrode assembly consisting of two (or multiples of two) bars of metal usually made of an alloy of copper and silver and the electronic control unit. The electrodes are usually installed in the swimming pool's filtration system. The control unit supplies the necessary extra low voltage across the electrodes. The resultant current produces positively charged ions of the constituent metals which are carried into the pool and become part of the chemistry of the pool water.

Silver ions act as a disinfectant and copper ions act as an algaecide. Although these ions kill algae and bacteria and provide a measurable residual quality, they do require an oxidiser to be present for the oxidation of organic wastes. Most manufacturers recommend the use of chlorine, but non-chlorine chemical oxidisers are also available.

Ozone is one of the most effective disinfectants and oxidisers available and once introduced into the water it starts to work immediately, killing bacteria and oxidising organic waste. As ozone is not highly soluble in water, the ozone must be injected into the water by either a compressor or venturi system.

However, as ozone is also toxic, all traces must be used or removed prior to a person using the pool. As there can be no residual of ozone when the pool is used, some other form of residual sanitiser like chlorine or bromine must also be used in order to provide continuous protection when the ozone generator is turned off.

Ultrasonics can also be used to clean surfaces remove existing scale, prevent scale formation and assist in sanitizing the water in the swimming pool by helping to break down the protective shell of most common parasitic organisms. Ultrasonic cleaning is a result of sound waves introduced into the water by means of a series of coils wrapped around a pipe that is part of the filtration circuit. The sound travels through the pipe carrying the water and creates waves of compression and expansion in the liquid. In the compression wave, the molecules of the fluid are compressed together tightly. Conversely, in the expansion wave, the molecules are forced apart, creating microscopic bubbles. The bubbles only exist for a split second and contain a partial vacuum while they exist.

As the pressure of the bubbles increases, the fluid around the bubble rushes in, collapsing the bubbles rapidly. When this occurs, a jet of liquid is created that may travel very quickly. They rise in temperature to as high as 5000 degrees Celsius. This extreme temperature, combined with the velocity of the liquid jet provides an intense cleaning action in a minute area. Due to the very short duration of the bubble expansion and collapse cycle, the liquid surrounding the bubble quickly absorbs the heat and the area cools quickly.

Potential problems in ultrasonic cleaning exist if the set point of any one or more of cleaning cycle time, temperature, chemistry, proximity to the transducer, ultrasonic output frequency, watts per liter or the volume of the liquid being cleaned is not correctly adjusted.

Traditional ultrasound technology is currently applied to the processing of low volumes and flow rates, typically in the range of 60-100 gallons per minute.

Each of the above systems has advantages and disadvantages. The inventors of the present invention have found that ionization on its own has an excellent residual but requires addition of an oxidizer, generally requiring the addition of chemicals or ozonation to prevent the build-up of debris on pool surfaces and the oxidization of oils and body fats.

Ultrasonics on its own will prevent the build-up of scale on pool surfaces and fitting and the reduction of parasitic growth.

Electronic Oxidization on its own would have to operate constantly to maintain the residual disinfection in the body of the pool water making it uneconomical in the domestic a commercial environment/

The inventors of the present invention found that the three processes working together complement each other and combine to be an excellent system in providing the required sanitizing processes without the addition of chemicals or ozone to achieve oxidization.

It will be clearly understood that, if a prior art publication is referred to herein; this reference does not constitute an admission that the publication forms part of the common general knowledge in the art in Australia or in any other country.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for a swimming pool cleaning and sanitation system.

The aforementioned aspects and other objectives and advantages can now be achieved as described herein. The present invention is directed to a swimming pool cleaning and sanitation system, which may at least partially overcome the abovementioned disadvantages or provide the consumer with a useful or commercial choice.

In one embodiment, the present invention can reside in an in-line cleaning and sanitation apparatus for cleaning a liquid contained in a body of liquid by removing a portion of the liquid from the body, cleaning and sanitizing the portion and returning the portion to the body, the apparatus comprising two or more two electrolytic cells, including an electrolytic ionization cell to produce ions having an algaecidal or bactericidal effect into the liquid, and an electrolytic oxidization cell to increase the oxidation reduction potential of the liquid; and an ultrasonic cleaning means to introduce sound waves into the liquid, wherein the two or more electrolytic cells are provided in the order of electrolytic oxidization cell, and electrolytic ionization cell and are operated simultaneously for a period to clean and sanitize the liquid in the absence of added salt, chlorine or other chemicals.

In another embodiment, the present invention can reside in a cleaning and sanitation method comprising the steps of providing electrolytic oxidation cell to increase the oxidation reduction potential of the liquid; providing an electrolytic ionization cell to produce ions having an algaecidal or bactericidal effect into the liquid, provided in that order; and providing an ultrasonic cleaning means to introduce sound waves into the liquid, and operating the electrolytic ionization cell, the ultrasonic cleaning means and the electrolytic oxidation cell simultaneously for a period to clean and sanitize the liquid without the addition of oxidation-promoting chemicals or ozone.

According to a particularly preferred embodiment, the ionization means may comprise two parts; an electrode assembly and an electronic control unit. The electrode assembly may preferably comprise two (or multiples of two) bars of metal, an anode and a cathode, at least one usually made of an alloy of copper and silver. According to a particularly preferred embodiment, the ionisation rods may each be an alloy of copper. A preferred composition of the alloy is, for example, 85% copper, 10% zinc and 5% silver.

The ionisation means may generally be installed in the swimming pool's filtration system. The ionisation means may preferably produce or introduce ions having an algaecidal (copper ions) or bactericidal (silver ions) into the liquid.

The control unit may preferably supply the necessary extra low voltage across the electrodes. The resultant current may produce positively charged ions of the constituent metals which are then carried into the pool and become part of the chemistry of the pool water. The input power to the controller may suitably be 110-250 volts at a frequency of approximately 50-60 hertz. It is preferred that the output power from the control unit is a 5 to 12 volt direct current at a maximum current of approximately 10 amperes which is transmitted to the rods. According to a particularly preferred embodiment, the power may be supplied to the ionisation rods at a level of about 90 milliamps and 5 volts of direct current.

According to a particularly preferred embodiment, the anode and cathode of the ionisation means as utilised in a domestic application such as a swimming pool may be approximately 25 mm in diameter and 100 mm in length. They are positioned approximately 15 mm apart. It is to be appreciated that in commercial applications which are generally larger in scale than domestic applications, larger rods may be preferred. A greater or lesser number of rods may be used in a commercial application.

The control unit may be connected to a power supply preferably through a timer. The control unit may suitably be associated with a circulation pump for circulating the water through the pool and/or the system in such a manner that the ionisation means is only operable when the circulation pump is activated.

As with a general electrolysis cell, the anode and the cathode may be sacrificial members. In order to prolong the lifespan of the rods, reduce debris build-up on the rods and minimise uneven wear to the rods, the polarity of the rods may be reversed periodically. The polarity may be reversed about each five to six minutes of operation for this purpose.

The silver and copper ions created by the ionisation means may preferably act to maintain the conductivity of the water without the addition of chemicals, particularly chlorine and also without the operation of a salt water chlorination device.

It is to be appreciated however that any ionisation means may be used according to the invention.

Any ultrasonic means may preferably be utilized according to the invention. The ultrasonic means may be configured to the particular type of liquid to be treated by adjusting any of the following parameters: flow rate through the ultrasonic means, volume of liquid to be treated, the level of cleanliness of the liquid initially or that required after treatment, water temperature or make-up for example pH.

More than one ultrasonic cleaning stage may preferably be required. The cleaning process may be enhanced through the use of agitation of the water in the pipes although it should be realized that the force provided by the pump moving the water through the system may agitate the water sufficiently.

According to a particularly preferred embodiment, the ultrasonic means may comprise a power supply connected to power source. The ultrasonic means may further comprise two aerials. The aerials may take the form of elongate members or wires. The aerials may preferably be wires approximately 2.5 mm in diameter.

The aerials are suitably wrapped about the pipe through which the water to be cleaned flows. The two aerials may be wound about the pipe starting from the same point on the pipe. Generally a minimum of seven revolutions may be required for the ultrasonic means to function optimally. It is preferred that each of the aerials revolve in opposed directions about the pipe, one in a clockwise direction and one in a counter-clockwise direction. The distance between each revolution may suitably be approximately 75 mm.

The power supply preferably creates a modulating ultrasonic field around the aerials, the field ranging in frequency from 50 to 80000 hertz. According to a particularly preferred embodiment, the power supply supplies a signal a variable frequency to each of the aerials. Preferably, the signal frequency starts at approximately 15 kilohertz and increases by 2 kilohertz over each two minute period. When a frequency of 71 kilohertz is reached, the frequency drops to 15 kilohertz and repeats the above process.

The ultrasonic means may be effective in converting salts and other solid material particularly calcium and silica based materials into an argonite material. Generally, salts and solids treated by ultrasonics may remain in the argonite form for up to 10 days.

A system according to the present invention operates in an in-line configuration; the actual wattage used may preferably be calculated on the basis of watts per liter per unit of time.

The electronic oxidation means may preferably take the form of a conventional electrolysis apparatus. The source of the voltage may be a low voltage, direct current electricity source. A higher voltage may not be needed as the conductivity in the water is heightened due to the addition of copper and silver ions created or introduced by the ionization means. Suitably an AC current is converted to a 25 ampere, 12 volt DC supply to the electrodes. Alternatively, a 15 ampere, 24 volts DC current may be used. The power supply may switch the polarity of the electrodes each twelve hour or twenty four hour period of operation in order to prolong the life of the electrodes.

In a particularly preferred embodiment, the application of a voltage across the electrodes in the electronic oxidation means may suitably increase the Oxidation Reduction Potential (ORP). The amount of change in the ORP may be dependent upon the voltage applied at the electrodes and the surface area of the electrodes.

In a particularly preferred embodiment, both of the electrodes in the electrolysis cell may be manufactured from titanium or be at least titanium coated. A preferred embodiment of the invention utilizes at least one coated steel electrode. The electrode may suitably be coated with an alloy of semi-precious metal, such as titanium or platinum.

The increase in ORP usually requires a level of Total Dissolved Solids in the water of between 500 to 800 ppm. The conductivity of the water treated according to the present invention is increased due to the operation of the ionization means and thus oxidation may be obtainable at lower levels of Total dissolved Solids due to the increased levels of ions in solution. Without the ionization means, the ORP may not be affected at lower levels of Total Dissolved Solids.

The system may preferably additionally comprise testing equipment to monitor the available parameters of the water and or swimming pool. The testing equipment may preferably continually sample the pool water.

Control means may also be provided for each element in the system, and/or the system as a whole. The cleaning elements may be operated at the same time or in any preset order of operation. The operation of the elements may overlap at least partially. It is preferred that the operation of the elements, including their start and finish time (if any), be controlled by the system control means. The control means may initiate a cleaning element's cleaning cycle, time the cycle, and shut down the element at the completion of the cleaning cycle.

The system according to the present invention may operate in at least a partially "in-line" formation whereby a portion of water is removed from the pool, treated by one or all of the cleaning processes, and then reintroduced into the pool. This type of system is common in the filtration of water in pools, spas and water features. According to an aspect of the present invention, the ionization means, the ultrasonic means and the electronic oxidation means may be located in the pipe work associated with a conventional in-line filtration system. It is also preferred that the elements of the present invention are located on the discharge side of any pump means provided to move the water through the system. The flow rate of water through the system may preferably be between 150 L/min and 300 L/min for domestic applications.

The system may operate continuously. One or more timers may also be provided.

According to a particularly preferred configuration, the apparatus of the present invention may be configured as two separate but interconnected physical components. The first component may suitably be the power supply/control means for the apparatus. The power supply/control means may also house the electronics associated with the apparatus within a pressure rated enclosure.

The enclosure may suitably be mounted adjacent but spaced from a standard 230-240 volt AC electrical power outlet and the swimming pool filter and pump.

The first component and in particular the power supply will generally be connectable to the electrical power outlet. The power supply may be associated with a 24 hour, 7 day timer in order to allow the operator of the apparatus to set the function and operation of the system and apparatus according to individual pool requirements.

The second component of the apparatus may be the ionization, oxidizing and ultrasonic chamber. This chamber will generally be plumbed into the pipe work of the pool filtration system between the pool filter and the return to the pool. The second component will be connected to the first component via at least electrical connections.

The second component may comprise an electronic oxidizing chamber and an ionization chamber in order after the pool filter with the ultrasonic aerials located between the respective chambers. Thus the water to be treated passes through the apparatus and system in the following order: electronic oxidizing chamber, pipe with ultrasonic aerials and the ionization chamber.

The above described treatment takes place in the swimming pool filtration system after the filter and before the water returns to the main body of the pool water.

The first components in the process are the Electronic Oxidizing plates. These have to be placed first in the system to get the cleanest water directly after the filter to prevent contamination of solids or CU/AG. Solids or CU/AG would build up on the plates rendering them ineffectual and dramatically shortening their operating life span.

The second components in the process are the copper and silver anode and cathode, these are placed second in the process as these are sacrificial and would plate out on the oxidizer plates if placed before them causing inefficiency and failure of the plates.

The third component in the system is the ultrasonics. These are third in the process to treat both the oxidized particles and the copper and silver ions directly after this process and before they return to the main body of the swimming pool water. The ultrasonics are preferably positioned last in the sequence to prevent particulates from the de-scaling process building up on the plates and copper silver electrodes.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
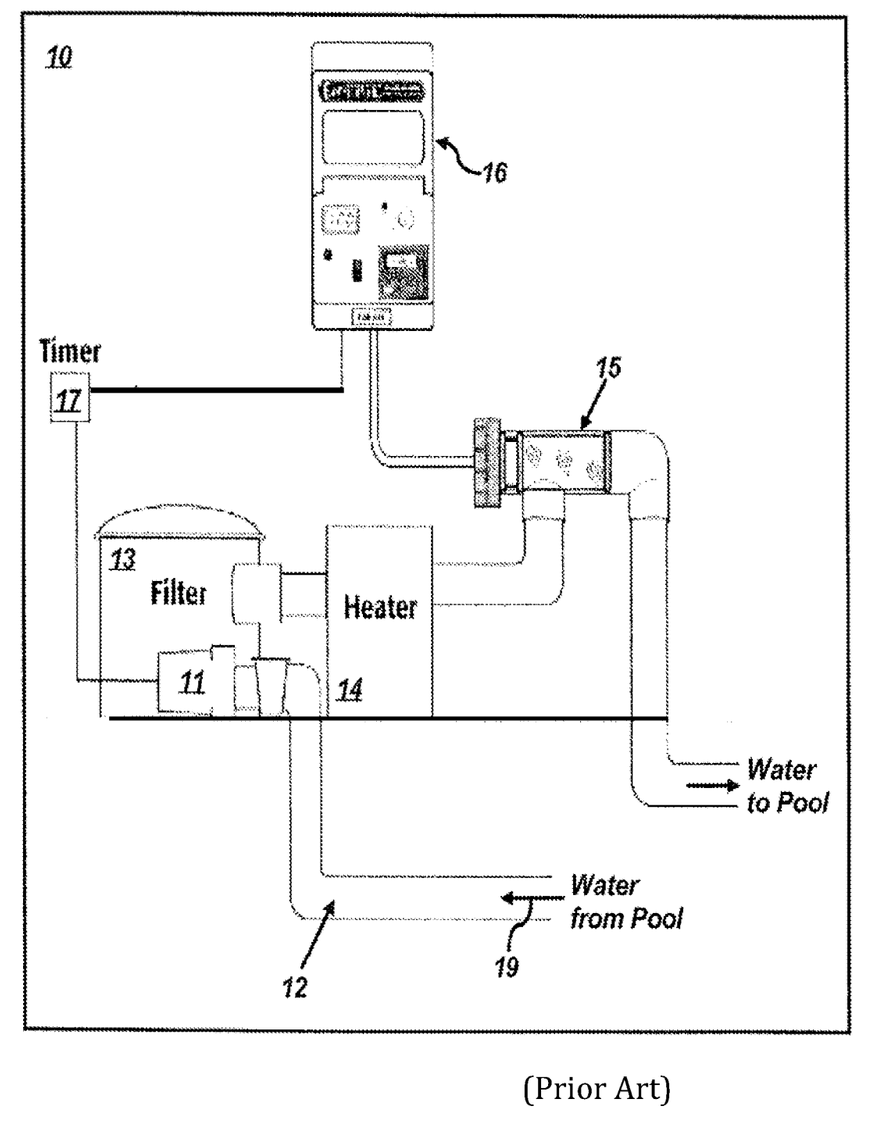
FIG. 1 illustrates a schematic view of a continuous salt water chlorinator to illustrate the in-line nature of the system.

According to a preferred embodiment, a swimming pool cleaning and sterilization apparatus is provided. An in-line cleaning system is illustrated in FIG. 1. A system such as the one illustrated in FIG. 1 may incorporate the ionization means and the electronic oxidation means according to the present invention. Alternatively, a system such as the one illustrated in FIG. 1 will have the electrolysis cell replaced with an ionization means, an ultrasonic cleaning means and an electronic oxidation means.

As can be seen from FIG. 1, water from the pool enters the system and is moved around the system by a pump 11. The pump moves the water from the intake pipe 12 into a filter 13. The filter 13 is designed to remove material such as undissolved particulates, leaves or sticks, from the liquid stream.

The water may then proceed through a heater 14 or similar apparatus, if the pool is a heated type pool. The heating may also take place to attain the optimum treatment conditions for the water.

From the heater 14, the water proceeds through an electrolytic cell 15. The cell 15 as illustrated, is generally used according to the salt water chlorination process. As stated above, the electrolysis cell in FIG. 1 will be replaced with an ionization means, an ultrasonic cleaning means and an electronic oxidation means.

From the electrolysis cell 15, the water proceeds back to the pool. The system is controlled by a control system 16 which generally houses the power pack as well. The system is fitted with a timer 17 to control the cycle time. The electrolysis cell 15 and the filter 13 are connected to the same power source.

The electronic oxidation means according to the invention operates to increase the oxidation reduction potential of the pool water.

Many chemical reactions take place when electrons are transferred from one material to another. In each case, one material is reduced by the addition of one or more electrons, while losing the same electrons oxidizes the other material. Therefore, the electrons that are available from the oxidized substance are added to the reduced material until an equilibrium condition is reached.

The size of an atom or ion and the number of electrons found in the outer electron shell determines the tendency of different materials to lose electrons. This is also known as the relative oxidation potentials of a particular material. The arbitrary standard for the potentials is the hydrogen electrode. The state of the reaction is then measured by the potential developed between an inert, noble metal electrode and a reference electrode.

The measuring electrode for ORP is usually gold or platinum. The noble metal donates and accepts electrons. The electrode acquires the electrochemical potential of the electrons, relative to the strongest redox equilibrium of the solution being measured. The electrode develops a voltage relative to the state of the reaction.

The reference electrode is the same electrode that is used for pH measurement. The ORP measurement becomes dependent on pH when the reaction involves hydrogen ions.

The system of the present invention operates with the ionization means and the electronic oxidation means in an in-line formation 21 and the ultrasonic aerials are positioned in an in-line configuration as well.

The ionization means comprises two rods of copper and silver alloy located in a clear plastic housing. The rods in domestic applications are approximately 25 mm in diameter and 100 mm in length and are positioned approximately 15 mm apart. The housing is plumbed into the pipe work of the in-line filtration system on the discharge side of the filter or pump prior to returning the water to the pool.

The average flow rate with the pumps available for this application is between 150 lts/min to 300 lts/min.

The ionization means power supply is connected to the domestic power supply preferably through a timer. The ionization means power supply has a piggy-back plug and the filtration systems circulating pump is plugged into the piggy back plug so the ionization means only runs with the pump in operation.

The power supply converts 240 volts AC to the required power supplies for each of the respective components of the apparatus. For the ionization chamber, the power is supplied at 200 milliamps and approximately 5 volts DC, and for the electronic oxidation chamber, the power is supplied at 15 amps and approximately 24 volts DC.

This low voltage DC power is connected to the copper and silver rods in the housing associated with the return pipe to the pool.

The polarity at the rods is reversed approximately every 6 minutes to allow even wear on the rods and prevent debris build up.

In the ultrasonic means, the power supply is connected to the domestic power source. Two aerials extend from the power supply. These aerials are wrapped around the pipe work of the system to be treated. A minimum of seven revolutions is required. One aerial revolves clockwise from the center and the other, anti-clockwise, the distance between the revolutions being approximately 75 mm.

The power supply, when operating, creates a modulating ultrasonic field around the aerials, which ranges between 50 Hz to 50,000 Hz. The power supply supplies a signal a variable frequency to each of the aerials. The signal frequency starts at approximately 15 kilohertz and increases by 2 kilohertz over each two minute period. When a frequency of 71 kilohertz is reached, the frequency drops to 15 kilohertz and repeats the above process.

Salts and solids are difficult to remove from water. These salts and solids easily precipitate out as scale on all surfaces within the circulating pipe work and devices within the system. These salts and solids are perfect for mollusks and parasites to use as building blocks for proliferation.

The ultrasonic means does not remove these salts and solids, but rather affects them at molecular levels. Calcium or silica molecules are very easily adhered to each other and precipitate out as scale on surfaces within the wet side of pool systems. The higher the level of this particulate the more scale which will occur.

Mollusks and parasites use these salts as building material for their growth and consequently they are present in a system having high levels of these salts and solids.

Ultrasonics adapts these salts and solids from the snowflake-like molecule, to a long thin brittle argonite molecule. This molecule has great difficulty adhering to surfaces or other materials and consequently scale build-up is reduced and existing scale is broken down and removed. Mollusks protective shells are also weakened and the sanitizer (created by the ionization means) is more easily able to penetrate the weakened shell and the mollusk or parasite is killed. New parasites or mollusks have difficulty surviving in the system as their protective barrier obtained from the calcium or silica is now unable to bond and therefore they cannot proliferate.

In use, the electronic oxidation means uses multiple amounts of steel plates coated with an alloy of semi-precious metals placed in a poly vinyl chloride (PVC) cell plumbed into the filtration circuit of the system. The electronic oxidation means operates on the principle of electrolysis with a cathode and an anode plate system. An AC/DC power supply allows production of approximately 15 ampere output at 24 volts of DC current. This power supply switches polarity approximately every 24 hours of operation.

When the system is operated the Oxygen Reduction Potential (ORP) of the water is increased. The amount of ORP generated is dependent on the voltage applied at the titanium plates and the surface area of the plates.

Conductivity in the water is increased and the oxidation is obtainable at lower Total Dissolved Solids due to the levels of copper and silver ions in the water.

The apparatus of the present invention is configured as two separate but interconnected physical components. The first component comprises the power supply/control means for the apparatus. The power supply/control means also houses the electronics associated with the apparatus within a pressure rated enclosure.

The enclosure is mounted adjacent to, but spaced from a standard 230-240 volt AC electrical power outlet and the swimming pool filter and pump.

The power supply will be connectable to the electrical power outlet. The power supply is associated with a 24 hour, 7 day timer in order to allow the operator of the apparatus to set the function and operation of the system and apparatus according to individual pool requirements.

The second component of the apparatus comprises the ionization, oxidizing and ultrasonic chamber. This chamber is plumbed into the pipe work of the pool filtration system between the pool filter and the return to the pool. The second component is connected to the first component via at least electrical connections.

The second component comprises an electronic oxidizing chamber and an ionization chamber in order after the pool filter with the ultrasonic aerials located between the respective chambers. Thus the water to be treated passes through the apparatus and system in the following order: electronic oxidizing chamber, pipe with ultrasonic aerials and the ionization chamber.

According to a particularly preferred embodiment, the system parameters and layout is as follows:

The system can be provided in two physical components. The first component is the power supply, which houses the electronics. These components are housed in an [i.p 35 rated] enclosure, which mounts within one [1] meter of the electrical power outlet and the swimming pool filter and pump.

The second component is the ionization, oxidizing and ultrasonic chamber, which is plumbed into the filtration systems pipe work on the section between the filter and the return to the pool water. This unit is connected electrically to the first component, the power supply.

The power supply can be plugged into a general power outlet of 230-240 volts AC. The power supply has a 24 hour 7 day timer where by the operator can set the system automatically to start and stop depending on individual pool requirements.

Electronic Oxidization Process.

The power supply, supplies power to the oxidizing plates at 15 Amps @ 24 Volts D.C. The polarity of the power supply reverses every twenty four [24] hour run time.

Ionization Process.

The power supply, supplies power for the ionization process at 90 milliamps @ 5 Volts D.C. The polarity of the power supply reverses every six [6] minutes.

Ultrasonic Process.

The power supply, supplies a signal to the two [2] ultrasonic aerials. Starting at fifteen kilohertz and increasing by two [2] kilo hertz increments over a two [2] minute period. When it reaches seventy-one [71] kilohertz and then reverts back to fifteen [15] kilohertz and repeats over again. The second component of the system the treatment chambers.

The First Chamber.

This chamber houses the electronic oxidizing plates which are capable of drawing fifteen amps [15] @ 24 Volts D.C. The plates are Titanium coated with Iridium. Unless these plates are made of such material there will be no reaction when the pool water is circulated past the plate at the correct water balance. (Correct water balance, Ph 7.2-7.4, Alkalinity 80-150 ppm, Calcium hardness 200+ppm, TDS's pool water 800-1000 ppm)

The Second Chamber.

This chamber houses the ionization rods these are an alloy of Copper Eighty Five [85]% Silver Five [5]% and Zinc Ten [10]%. These rods are placed after the Electronic oxidizer cell to prevent plating of the copper and sliver ions on the oxidizer plates. If the ionization rods were placed before the oxidizer, this would over a short time cause the oxidizer plates to fail.

After the Two Chambers.

The two-[2] ultrasonic aerials are wound onto the pipe. The wire is 2.5-millimeter wound on from the starting point, minimum rounds seven [7] and at opposing directions from the center. Clockwise and anti-clockwise from the center.

A particular embodiment of the present invention is described in the Experimental Report of ANNEX: "*Pseudomonas aeruginosa* Disinfection in Pool Spas; Laboratory experiments conducted with Envrioswim System for WaterTech Services International Pty Ltd." by Paul Wright, Ph.D, which is incorporated herein by reference in its entirety.

In the present specification and claims, the word "comprising" and its derivatives including "comprises" and "comprise" include each of the stated integers but does not exclude the inclusion of one or more further integers.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An in-line cleaning and sanitation apparatus for cleaning and sanitizing a liquid contained in a closed body of liquid by removing a portion of the liquid from the body, cleaning and sanitizing the portion and returning the portion to the body, the apparatus comprising
    a) at least two electrolytic cells, including an electrolytic ionization cell with power supplied thereto at a first voltage and first amperage, which produce ions having an algaecidal or bactericidal effect into the liquid, and an electrolytic oxidization cell with power supplied thereto at a second voltage and second amperage each of which are higher than said first voltage and said first amperage supplied to said electrolytic ionization cell, to increase the oxidation reduction potential of the liquid and
    b) ultrasonic cleaning means to introduce sound waves into the liquid,
    wherein the electrolytic ionization cell comprises at least an electrode assembly and an electronic control unit, the electrode assembly comprising at least an anode and a cathode, at least one made of a metal selected from the group consisting of alloys of copper, alloys of copper and silver, and alloys of copper, zinc, and silver,
    wherein the electrolytic oxidation cell comprises an electrode assembly that increases the Oxidation Reduction Potential (ORP), rendering oxidation of organic wastes obtainable at lower levels of total dissolved solids due to an increased level of ions in solution created or introduced by the ionization cell, and is made of a metal selected from the group consisting of titanium, steel, steel coated with titanium, and steel coated with platinum and mixtures thereof,
    wherein the at least two electrolytic cells are provided in the order of the electrolytic oxidization cell upstream, followed by the electrolytic ionization cell downstream, and each are capable of being operated for a period of time sufficient to clean and sanitize the liquid in the absence of added salt, chlorine or other chemicals, by removing a portion of the liquid from the body, cleaning and sanitizing the portion through the apparatus and returning the portion to the body.

2. The apparatus according to claim 1 wherein the composition of the electrolytic ionization cell alloy is 85% copper, 10% zinc and 5% silver.

3. The apparatus according to claim 1 wherein the anode and the cathode may be sacrificial members and the polarity of the anode and the cathode is reversed periodically, to prolong the lifespan of the anode and the cathode, reduce debris build-up on the anode and the cathode or minimise uneven wear to the anode and the cathode.

4. The apparatus according to claim 1 wherein the electrolytic ionisation cell generates ions having an algaecidal or bactericidal effect in the liquid.

5. The apparatus of claim 4 wherein said metal ions having an algaecidal effect comprises copper ions.

6. The apparatus of claim 4 wherein said metal ions having a bactericidal effect comprises silver ions.

7. The apparatus according to claim 4 wherein the metal ions generated by the electrolytic ionisation cell act to maintain the conductivity of the water without the addition of chlorine and also without the operation of a salt water chlorination device.

8. The apparatus according to claim 1 wherein the ultrasonic means comprises at least two aerials, wrapped about a pipe through which the water to be cleaned flows, the two aerials wound about the pipe starting from the same point on the pipe, each of the aerials revolving in opposed directions about the pipe, one in a clockwise direction and one in a counter-clockwise direction, the distance between each revolution being approximately 75 mm.

9. The apparatus according to claim 8 further including a power supply, which supplies a signal of variable frequency to each of the aerials.

10. The apparatus according to claim 9 wherein the signal frequency starts at approximately 15 kilohertz and increases by 2 kilohertz over each two minute period, upon reaching a frequency of 71 kilohertz, the frequency drops to 15 kilohertz and repeats.

11. The apparatus according to claim 1 wherein the elements of the apparatus are at least in a partially "in-line" formation whereby a portion of liquid is removed from a body of liquid, treated by one or all of the cleaning processes, and then reintroduced into the body of liquid.

12. A cleaning and sanitation system for cleaning a liquid contained in a closed body of liquid, the apparatus comprising
    an electrolytic oxidation cell, with power supplied thereto at a first voltage and first amperage, to increase the oxidation reduction potential of the liquid,
    an electrolytic ionization cell, with power supplied thereto at a second voltage which is lower than said first voltage and second amperage which is lower than said first amperage, which produce ions having an algaecidal or bactericidal effect into the liquid,
    provided in the sequence of said oxidation cell upstream followed by said ionization cell downstream, and
    ultrasonic cleaning means to introduce sound waves into the liquid,
    such that the electrolytic ionization cell, the ultrasonic cleaning means and the electrolytic oxidation cell are operated simultaneously for a period to clean and sanitize the liquid in the absence of added salt, chlorine or other chemicals, by removing a portion of the liquid from the body, cleaning and sanitizing the portion through the apparatus and returning the portion to the body,
    wherein said electrolytic ionization cell comprises at least two parts, an electrode assembly and an electronic control unit, the electrode assembly comprising at least an anode and a cathode, at least one made of a metal selected from the group consisting of alloys of copper, alloys of copper and silver, and alloys of copper, zinc, and silver, wherein the electrolytic oxidation cell comprises an electrode assembly made of a metal selected from the group consisting of titanium, steel, steel coated with titanium, and steel coated with platinum and mixtures thereof.

13. The apparatus according to claim 12 wherein the composition of the electrolytic ionization cell alloy is 85% copper, 10% zinc and 5% silver to generate metal ions having an algaecidal or bactericidal effect into the liquid.

14. The apparatus according to claim 13 wherein the anode and the cathode may be sacrificial members and the polarity of the anode and cathode is reversed periodically, to prolong the lifespan of the anode and cathode, reduce debris build-up on the anode and cathode or minimise uneven wear to the anode and cathode.

15. A cleaning and sanitation method for a closed body of liquid, the method comprising the steps of providing an electrolytic oxidation cell, with power supplied thereto at a first voltage and first amperage, to increase the oxidation reduction potential of the liquid, providing an electrolytic ionization cell, with power supplied thereto at a second voltage which is lower than said first voltage and second amperage which is lower than said first amperage, which produce ions having an algaecidal or bactericidal effect into the liquid, provided in the sequence of said oxidation cell upstream followed by said ionization cell downstream, and providing an ultrasonic cleaning means to introduce sound waves into the liquid, wherein the electrolytic ionization cell comprises at least an electrode assembly comprising at least an anode and a cathode, at least one made of a metal selected from the group consisting of alloys of copper, alloys of copper and silver, and alloys of copper, zinc, and silver, wherein the electrolytic oxidation cell comprises an electrode assembly made of a metal selected from the group consisting of titanium, steel, steel coated with titanium, and steel coated with platinum and mixtures thereof, operating the electrolytic ionization cell, the ultrasonic cleaning means and the electrolytic oxidation cell simultaneously for a period to clean and sanitize the liquid without the addition of oxidation-promoting chemicals or ozone, and removing a portion of the liquid from the body, cleaning and sanitizing the portion through the apparatus, and returning the portion to the body.

* * * * *

UNITED STATES PATENT AND TRADEMARK OFFICE
CERTIFICATE OF CORRECTION

| | | |
|---|---|---|
| PATENT NO. | : 8,545,682 B2 | |
| APPLICATION NO. | : 12/189137 | |
| DATED | : October 1, 2013 | |
| INVENTOR(S) | : Phillip Henry Jones et al. | |

It is certified that error appears in the above-identified patent and that said Letters Patent is hereby corrected as shown below:

In the Claims

Column 13, Claim 15, Line 19 - Column 14, Lines 1-24 should read

15. A cleaning and sanitation system for cleaning a liquid contained in a closed body of liquid, the apparatus comprising     an electrolytic oxidation cell, with power supplied thereto at a first voltage and first amperage, to increase the oxidation reduction potential of the liquid,     an electrolytic ionization cell, with power supplied thereto at a second voltage which is lower than said first voltage and second amperage which is lower than said first amperage, which produce ions having an algaecidal or bactericidal effect in the liquid,     provided in the sequence of said ~~upstream~~ oxidation cell <u>upstream</u> followed by said ~~downstream~~ ionization cell <u>downstream</u>, and     ultrasonic cleaning means to introduce sound waves into the liquid,     such that the electrolytic ionization cell, the ultrasonic cleaning means and the electrolytic oxidation cell are operated simultaneously for a period to clean and sanitize the liquid in the absence of added salt, chlorine or other chemicals, by removing a portion of the liquid from the body, cleaning and sanitizing the portion through the apparatus and returning the portion to the body, Signed and Sealed this
Twelfth Day of November, 2013

Teresa Stanek Rea
*Deputy Director of the United States Patent and Trademark Office*

Column 13, Claim 15 continued wherein said electrolytic ionization cell comprises at least two parts, an electrode assembly and an electronic control unit, the electrode assembly comprising at least an anode and a cathode, at least one made of a metal selected from the group consisting of alloys of copper, alloys of copper and silver, and alloys of copper, zinc, and silver, wherein the electrolytic oxidation cell comprises an electrode assembly made of a metal selected from the group consisting of titanium, steel, steel coated with titanium, and steel coated with platinum and mixtures thereof.